E. MATTMAN.
COMMUTATOR.
APPLICATION FILED AUG. 6, 1909.
992,372.
Patented May 16, 1911.
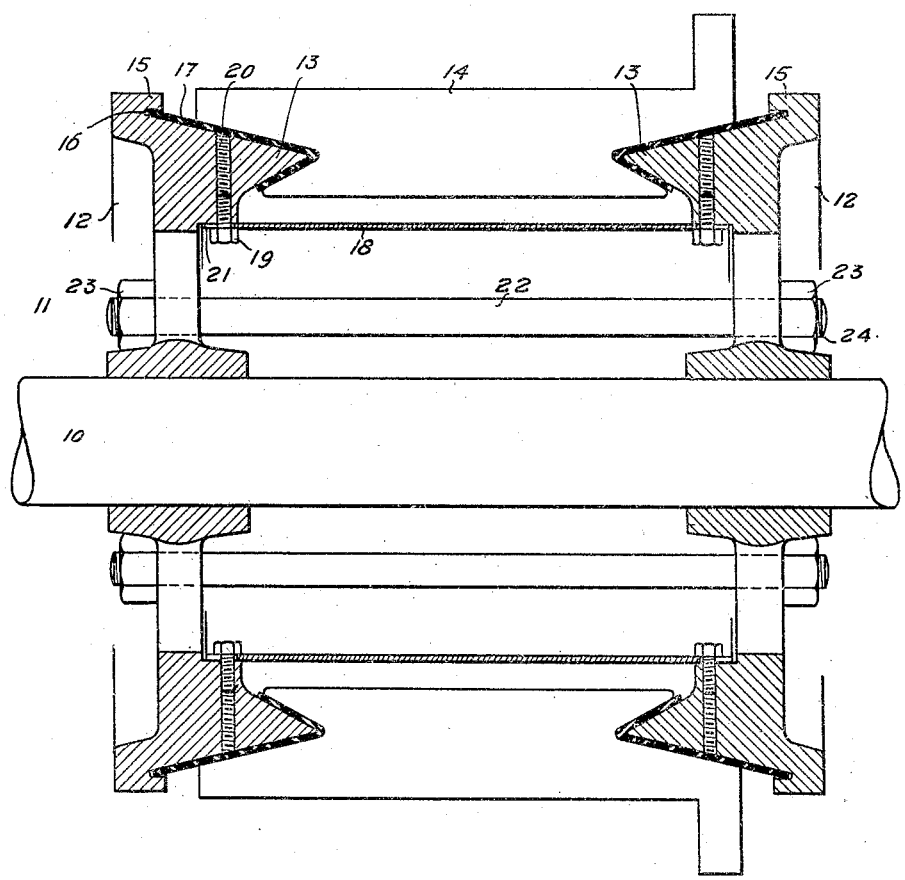

UNITED STATES PATENT OFFICE.

EMIL MATTMAN, OF MILWAUKEE, WISCONSIN, ASSIGNOR TO ALLIS-CHALMERS COMPANY, A CORPORATION OF NEW JERSEY.

COMMUTATOR.

992,372.  Specification of Letters Patent.  Patented May 16, 1911.

Application filed August 6, 1909. Serial No. 511,493.

*To all whom it may concern:*

Be it known that I, EMIL MATTMAN, a citizen of Switzerland, residing at Milwaukee, in the county of Milwaukee and State of Wisconsin, have invented certain new and useful Improvements in Commutators, of which the following is a full, clear, and exact specification.

My invention relates to the construction of commutators for dynamo-electric machines.

One of the objects of my invention is to improve means for retaining insulation used in the construction of commutators.

Another object of my invention is to provide simple and effective means for preventing dust or other injurious matter from coming in contact with bars of the commutator.

My invention further consists in certain novel details of construction and arrangement of parts to be described in the specification and set forth in the appended claims.

In the accompanying sheet of drawing the single figure is a partial sectional view of the commutator embodying my invention.

Referring to the figure of the drawing, a shaft 10 has been shown upon which is mounted a spider 11 comprising two annular interchangeable members 12 having enlarged portions 13 for centering and supporting a commutator 14, which includes a plurality of bars. These annular members 12 are provided with projections or undercut portions 15, preferably integral and extending inwardly relative to the commutator, forming recesses 16 for the reception of insulation 17 which is interposed between the spider and the commutator bars. When the ends of the insulation 17 are placed in the recesses 16 it is impossible for said insulation to be thrown out by the action of centrifugal or other forces. By means of using the projections 15 for retaining the insulation 17 in position, the use of cording is obviated.

A member 18, preferably formed of sheet metal, is secured to the annular members 12 by bolts 19 which engage the threaded portions of tapped holes 20. This cylindrical member 18 forms a shell passing completely around the inner part of the spider and prevents any dust or other injurious matter from coming in contact with the under side of the commutator bars which might cause a short circuit. The shell is further provided with slots 21 to allow for the shifting of the shell if desired. The two annular members are held together by bolts 22 and may be drawn up to any desirable degrees of tightness by nuts 23 which engage the threaded portions 24 of the bolts 22. This spider can be used for supporting and centering a commutator of any desired length. The shell 18 also serves as added stiffening means for the light and comparatively inexpensive structure. The internal structure of the commutator is open, thus allowing for the passage of currents of air for cooling purposes.

There may be many modifications in the precise arrangement herein shown and described and I aim in my claims to cover all such modifications which do not depart from the spirit and scope of my invention.

What I claim as new is:—

1. A commutator comprising a plurality of bars, a spider for supporting said bars, and a member provided with slots and secured to said spider to prevent injurious matter from coming in contact with said bars, said slots arranged to permit axial shifting of said member.

2. A commutator comprising a plurality of bars, a spider supporting said bars, a member adapted to prevent injurious matter from coming in contact with said bars, said member having slots, and retaining means passing through said slots to secure said member to said spider, said slots and means being arranged to permit shifting of said member.

3. A commutator comprising a plurality of bars and a spider for supporting said bars, and a member provided with slots and secured to said spider to prevent injurious matter from coming in contact with said bars, said slots arranged to permit shifting of said member.

In testimony whereof I affix my signature, in the presence of two witnesses.

EMIL MATTMAN.

Witnesses:
 CHAS. L. BYRON
 ROB. E. STOLL.